Aug. 11, 1931.  C. V. McINTIRE  1,817,926

DISTILLATION OF PITCH INTO COKE

Filed Feb. 3, 1928

INVENTOR
CHARLES V. MCINTIRE
BY
John E. Hubbell
ATTORNEY

Patented Aug. 11, 1931

1,817,926

UNITED STATES PATENT OFFICE

CHARLES V. McINTIRE, OF EAST ORANGE, NEW JERSEY, ASSIGNOR TO CONSOLIDATION COAL PRODUCTS COMPANY, OF WILMINGTON, DELAWARE, A CORPORATION OF DELAWARE

DISTILLATION OF PITCH INTO COKE

Application filed February 3, 1928. Serial No. 251,526.

The general object of my present invention is to provide a continuous process of converting pitch and like hydro-carbonaceous semi-liquids into coke by destructive distillation and particularly by a low temperature distillation process in a retort. More specifically, the object of my invention is to subject a hydro-carbonaceous semi-liquid to a low temperature distillation process in a horizontal retort of the general type shown in my prior Patent, No. 1,479,827, granted January 8, 1924 and in which the substance is mechanically agitated and heated to such a temperature that most of the volatile content of the material will be driven off and the residue discharged from the retort as strong dry coke pellets having a relatively small percentage of volatile matter.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Figure 1:
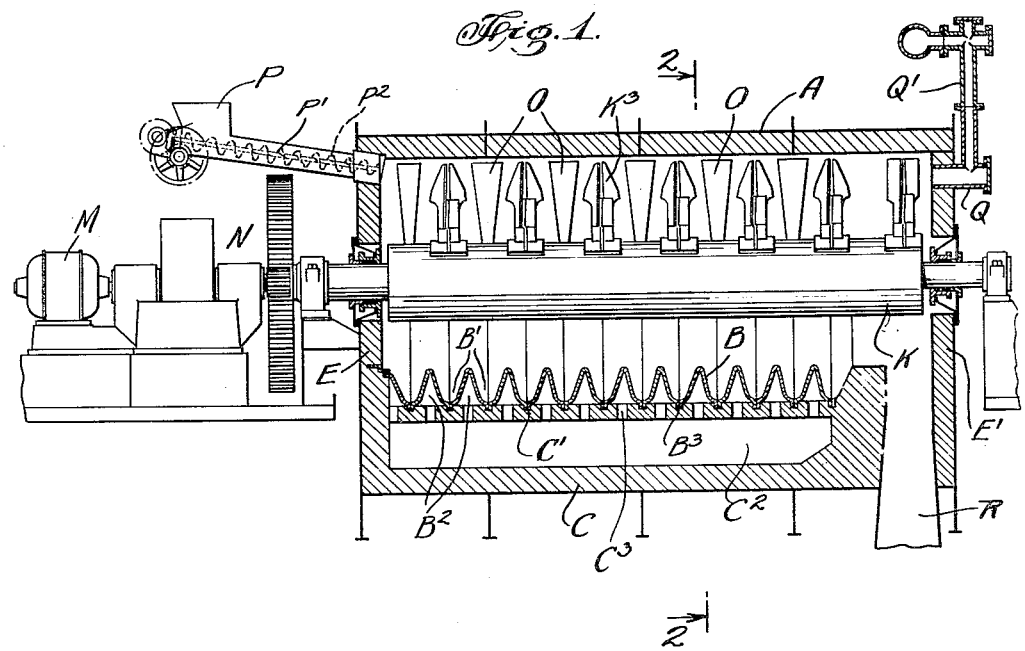
Fig. 1 is a sectional elevation of the retort.
Figure 2:
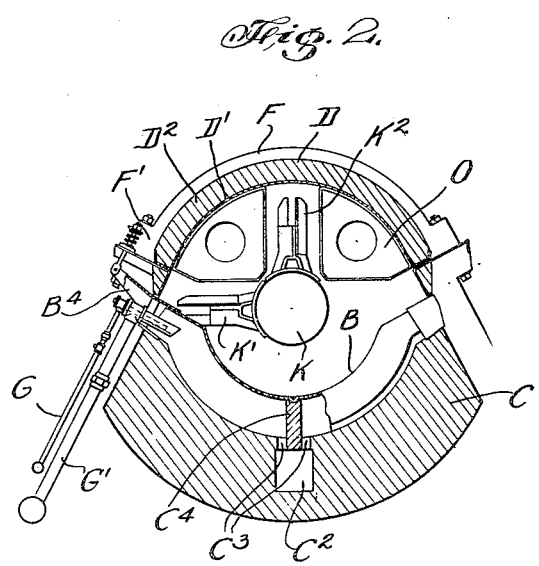
Fig. 2 is a partial section on the line 2—2 of Fig. 1.

In the drawings I have illustrated a preferred form of apparatus in which my improved process may be performed. A horizontal retort A is provided with a bottom heating wall B in the form of a semi-cylinder and corrugated to provide alternating internal and external grooves B' and B² respectively to increase the effective heating surface and to heat the inner portion of the material. The bottom wall is seated in and secured to a refractory housing C mounted on a suitable structural support. A roof member D is likewise a semi-cylinder and constructed of curved steel plates D' covered by refractory insulating material D². The metallic wall B is composed of a series of arc-shaped segments V-shaped in section and extending crosswise of the retort. The wall sections are separated by a wall C⁴ extending longitudinally of the retort. The lower ends B³ of the corrugated sections are inserted in grooves C' formed in the refractory body C and sealed by fire clay. The ends of the retort are closed by refractory walls E and E'. The roof D is connected to the corrugated wall B by a series of yoke members F semicircular in form and connected at their lower ends F' to extension pieces B⁴ mounted on the upper ends of several horizontally spaced bottom wall sections. Each extension B³ has a spring bolt connection with the corresponding end of one of the yoke members.

The retort heating means comprises a series of burner nozzles of the Bunsen type projecting into burner flues formed by the segmental wall sections B. Each burner is connected to air and gas distribution pipes G and G' respectively. The products of combustion escape from the burner flues by passing downwardly through openings C³ in the refractory support wall into an off-take flue C² connected to a stack or other draft creating device.

The agitating means of my invention for stirring the material in the retort and thereby effecting a gravity feed therethrough comprises a hollow shaft K preferably a steel pipe journalled in external bearings to the end wall of the retort and provided with two sets of agitating arms K' and K². Each of the arms is provided at its outer end with a paddle portion K³ composed of a pair of structural angles and having its opposite edges shaped to correspond to the curvature of the walls of the corresponding internal groove B' through which it sweeps. The arms K' and K² are angularly spaced by an angle of 90° or so.

The shaft K is oscillated by a reversing motor M to the shaft of which a reduction gear train N is connected. As the shaft is oscillated, the arms pass between stationary wiping paddles O in the upper half of the retort which scrape off any material on the paddles.

The material to be treated is passed into one end of the retort through a hopper P and feed pipe P' having a screw conveyor P² therein, and inclined at an angle to the horizontal. The rate of feed may be changed by operating gearing diagrammatically shown at one end of the feed pipe to change the angle thereof with respect to the horizontal and by regulating the speed of the conveyor. The end wall E' is formed with an outlet Q connected to a standpipe Q' through which the distillation gases pass. The dry coke pellets are discharged through the outlet passage R.

Coke has heretofore been produced from crude oil and pitch by heating the material in a stationary tank still. In such processes the material is continuously heated until most of the volatile matter is driven off and an agglomerated mass of coke is left in the still. This must be removed from the retort manually. Such processes have been found disadvantageous because all of the material is not uniformly heated and the lower plates of the still are maintained at an undesirably high temperature during the heating operation. The normal life of these plates is comparatively short and the plates must be frequently replaced.

In my improved process, a semi-liquid hydro-carbonaceous material such as pitch is continuously fed to the retort through the feed pipe P' to maintain the retort chamber partially filled. The hydro-carbonaceous material may be either heated and then passed to the retort or supplied to the retort in a pulverulent solid state. Heat is supplied by the burners sufficient to maintain the temperature within the retort walls between 1200° and 1300° F. The pitch is continuously advanced by the constant agitation of the stirrer arms which causes all portions of the material to come into direct contact with the heating flue walls. The distillation is partly destructive and a small amount of the material is cracked yielding gas and oil vapor. The temperature of the material during its passage through the retort is approximately 800° F. and the material becomes less viscous as it is advanced. The various volatile constituents of the pitch are driven off during its passage as the temperature of the material increases. The coke pellets normally begin to form at a point about half the length of the retort. This point can be varied however by changing the speed of the shaft K or the rate at which heat is supplied to the heating walls. The partially devolatilized residue passing down through the discharge passage R is in the form of dry coke pellets ranging from one-sixteenth to several inches in diameter. The by-products may be recovered in the usual manner from the gases and oil vapor passing off through the standpipe. The main volatile products are the heavy tar oils commercially used for creosoting.

In one test run of the improved process in an apparatus of the general type described, the average temperature in the retort wall was 1370° F. and the temperature of the pitch being processed was approximately 800° F. The pitch showed on proximate analysis 35.68% volatile matter and an analysis of the coke produced showed that the volatile had been reduced to 7.31% by the process. The material required about an hour to pass through the retort. The structure of the coke was much harder than the usual semi-coke produced from coal by similar low temperature distillation processes and the coke heretofore produced from pitch in tank stills. A portion of the coke pellets produced could be marketed as a fuel without briquetting because of the relatively large size.

The process disclosed is characterized by its simplicity, effectiveness and low cost of operation. The plant can be maintained in continuous operation with only periodic shutdown periods for inspection and repairs. No part of the apparatus used is subjected to excessive temperatures as the continuous subjecting of fresh portions of the material to contact with the retort heating walls serves to uniformly heat the material and maintain said walls at a temperature which is approximately that of the material being heated. The coke produced is entirely satisfactory as a fuel and in some cases may be used directly in a furnace and in other cases, the material may be crushed and briquetted.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. The method of producing coke from a semi-liquid hydrocarbonaceous material which comprises continuously passing the material to be coked horizontally through a closed distillation chamber partially filled with previous portions of the material, externally heating said chamber to volatilize a substantial portion of the volatile constituents of the material therein, continuously agitating the material to present fresh portions thereof to the heated chamber wall, and moving the material through the chamber at a rate sufficient to carbonize the portion of the material not wholly devolatilized in the chamber.

2. The method of producing coke from pitch which comprises continuously passing the pitch horizontally through a closed distillation chamber, externally heating the lower portion of said chamber to volatilize a substantial portion of the volatile constitutents of the pitch therein, removing the volatilized constituents from the chamber, continuously agitating the pitch to present fresh portions thereof to the heated chamber wall, and moving the pitch through the chamber at such a rate that the partially unvolatilized residue will be discharged in the form of carbonized coke pellets of various sizes.

3. The method of producing coke from pitch which comprises continuously passing the pitch to be treated into a closed distillation chamber, externally heating said chamber to volatilize a substantial portion of the volatile constituents of the pitch therein, continuously removing the volatilized constituents from the chamber, continuously agitating the pitch therein to present fresh portions thereof to the heated chamber wall, and continuously moving the pitch horizontally through the chamber at a predetermined rate sufficient to effect carbonization of the unvolatilized residue and its discharge from the chamber in the form of hard dry coke pellets having a volatile content not over 16%.

Signed at New York city, in the county of New York and State of New York, this 2nd day of February, A. D. 1928.

CHARLES V. McINTIRE.